(12) United States Patent
Samuelsen et al.

(10) Patent No.: US 7,584,607 B2
(45) Date of Patent: Sep. 8, 2009

(54) METHOD OF AND APPARATUS FOR OPERATING A DRIVE TRAIN WITH AN ELECTRICAL MACHINE

(75) Inventors: Dirk Samuelsen, Ludwigsburg (DE); Ruediger Fehrmann, Leonberg (DE); Matthias Schueler, Steinheim (DE)

(73) Assignee: Robert Bosch GmbH, Stuttgart (DE)

( * ) Notice: Subject to any disclaimer, the term of this patent is extended or adjusted under 35 U.S.C. 154(b) by 44 days.

(21) Appl. No.: 11/338,840

(22) Filed: Jan. 25, 2006

(65) Prior Publication Data

US 2006/0162322 A1   Jul. 27, 2006

(30) Foreign Application Priority Data

Jan. 26, 2005   (DE) ............... 10 2005 003 628

(51) Int. Cl.
*F01N 3/00*   (2006.01)
(52) U.S. Cl. ............... 60/295; 60/274; 60/280; 60/285; 60/297

(58) Field of Classification Search ............ 60/274, 60/284, 285, 295, 297, 300, 303, 311, 280, 60/286; 180/165, 65.2, 65.3, 65.4, 65.5
See application file for complete search history.

(56) References Cited

U.S. PATENT DOCUMENTS

| | | | | |
|---|---|---|---|---|
| 5,566,774 A | * | 10/1996 | Yoshida | 180/65.4 |
| 5,836,151 A | * | 11/1998 | Atanasyan et al. | 60/274 |
| 6,079,204 A | * | 6/2000 | Sun et al. | 60/274 |
| 6,173,569 B1 | * | 1/2001 | Kusada et al. | 60/277 |
| 6,381,955 B1 | * | 5/2002 | Morganti et al. | 60/300 |
| 7,007,460 B2 | * | 3/2006 | Frieden et al. | 60/284 |

* cited by examiner

*Primary Examiner*—Binh Q Tran
(74) *Attorney, Agent, or Firm*—Ronald E. Greigg

(57) ABSTRACT

The invention is based on a method for operating an engine drive train having a connectable electrical machine, the electrical machine being drivingly connectable to the engine in whose exhaust gas system an exhaust gas cleaning device is located. A moment output of or drawn by the electrical machine is impressed on a moment of the engine that is demanded by an engine control unit, as a function of an operating state of the exhaust gas cleaning device.

9 Claims, 2 Drawing Sheets

METHOD OF AND APPARATUS FOR OPERATING A DRIVE TRAIN WITH AN ELECTRICAL MACHINE

CROSS-REFERENCE TO RELATED APPLICATIONS

This application is based on German Patent Application 10 2005 003 628.7 filed Jan. 26, 2005, upon which priority is claimed.

BACKGROUND OF THE INVENTION

1. Field of the Invention

The invention is based on a method for operating a drive train with an electrical machine, and on an apparatus for performing the method.

2. Description of the Prior Art

Exhaust gas posttreatment systems, such as the Diesel particle filter (DPF) or the NOx-storing catalytic converter (NSC), are used to maintain exhaust gas limit values. In the case of the Diesel particle filter, the particles that occur in combustion are collected. At high exhaust gas temperatures, the collected particles are burned off, and the Diesel particle filter is evacuated again. However, this is done only at high load, without additional interventions. Moreover, provisions for increasing the temperature, such as purposefully lessening the engine efficiency by shifting injection to late, postinjection, and so forth, or preheating the intake air and regeneration of the Diesel particle filter, can be possible over a wider operating range. However, the result is fewer advantages of the Diesel engine over the Otto engine. It can also happen that if the load and rpm are too low, regeneration of the Diesel particle filter is not possible, because of the low exhaust gas temperature. This range presents a problem for the operating reliability of the Diesel particle filter.

The operation of the NOx-storing catalytic converter is subdivided into NOx storage phases and regeneration phases. Because of the limited storage capacity of the NOx-storing catalytic converter, these phases alternate in rapid succession. In the NOx-storing catalytic converter, the NOx storage efficiency is poor at low exhaust gas temperatures. Particularly in the first phase of the so-called New European Driving Cycle, this leads to comparatively high NOx emissions. The regeneration of the NOx-storing catalytic converter is done in the rich mode at an air number $\lambda<1$, since uncombusted hydrocarbons are needed to reduce the stored NOx molecules. For attaining the rich mode, the engine is choked, and the injection is adjusted such that at the same engine moment, a greater mass of fuel is injected. This in turn means markedly lower efficiency during the regeneration, and hence a lessening of the advantages in terms of fuel consumption over the Otto engine.

From German Patent Disclosure DE 101 60 018 A1, a drive with an internal combustion engine and an electrical machine has been disclosed, in which as a function of an instantaneous demand for power to the drive and as a function of the instantaneously available power of the drive, an optimal engine rpm is predetermined by means of coordinated triggering of the engine and the electrical machine, while maintaining the instantaneous power demand.

OBJECT AND SUMMARY OF THE INVENTION

According to the invention, it is proposed that a moment output by or drawn up by the electrical machine is impressed on an engine moment that is demanded by an engine control unit, as a function of an operating state of the exhaust gas cleaning device. The electrical machine can be selectively operated as a motor or as a generator. It advantageously results that the additional moment furnished or output by the electrical machine is impressed on the engine moment demanded by the engine control unit in such a way that in certain operating situations, such as the regeneration of a particle filter and/or of an NOx-storing catalytic converter, this has positive effects on the engine emissions and/or efficiency or even makes these operating situations, which are necessary for the regeneration, possible in the first place. The engine is preferably a Diesel-fueled engine. An Otto engine with direct injection or the like is also favorable. Preferably, the electrical machine is a starter-generator. However, the method can also be implemented with other electrical driving machines, of the kind used for instance in hybrid systems. It is especially advantageous that by shifting the load on the engine, conditions are created in which it is easier to perform regeneration of the exhaust gas cleaning device, such as a particle filter and/or an NOx-storing catalytic converter. For instance, with the method of the invention, regeneration can be performed even at very low loads, which conventionally is otherwise impossible.

In a favorable refinement, from a desired moment, demanded by a driver, during a storage phase of nitrogen oxides into the exhaust gas cleaning device, an optimized engine moment is derived, in that as a function of a bandwidth around the desired moment, within which bandwidth the electrical machine, such as a starter-generator, can draw or output moment, a target function dependent at least on engine efficiency, on crude NOx emissions and on an NOx storage rate, is optimized by specification of the engine moment. Since advantageously the engine moment can be selected freely within the bandwidth, an engine control strategy for optimizing the target function can be made possible. Along with the parameters mentioned, still other parameters may be used in the target function. This enables flexible adaptation of the engine control strategy to different peripheral conditions. The method of the invention is favorable in combination with a starter-generator. In contrast to an electrical driving machine, a starter-generator is indeed suitable for starting, but only within limits for driving a vehicle. Within the given limits, the starter-generator can advantageously be incorporated as an additional controlling variable for exhaust gas posttreatment strategies. This can be done in addition to or as an alternative to already known controlling variables. With the strategy according to the invention, an increase in the exhaust gas temperature and hence an improvement in the storage rate of the storage-type catalytic converter can be attained in certain phases of operation.

Advantageously, the optimized engine moment can be fed into a moment path of an engine control unit of the engine. A conventional moment path of an electronic Diesel control unit (EDC) can be used without modification.

In addition, the electrical machine can draw or output a moment, which together with the engine moment results in a moment that is available to the driver for the drive train.

It is favorable if in a regeneration phase of the exhaust gas cleaning device, the electrical machine draws an increased moment, and the engine is subjected to a load that is increased by the amount of the moment. Preferably, the electrical machine draws its maximum moment. A storage-type catalytic converter is preferably regenerated in the regeneration phase. By means of the impressed moment of the electrical machine, the load on the engine is advantageously shifted such that regeneration of the exhaust gas cleaning device becomes generally easier. Thus regeneration becomes possible even at very low engine loads. In the regeneration, the engine can also preferably be operated wherever the efficiency of the nitrogen oxide storage is especially high. A rich mode can also be implemented with only slight losses of efficiency. A decrease in the engine efficiency for the sake of attaining a low air number is advantageously reduced. By increasing the load on the engine, its air number is lowered, compared to operation without an electrical machine. Since further provisions known at present, such as choking and adjusting the injection, are based on this lesser air number in order to reduce the air number to a value of less than one, the decrease in efficiency is also less. An air number less than one is preferred in the regeneration of the storage-type catalytic converter. Simultaneously, the moment drawn by the electrical machine can be stored, particularly in the form of electrical energy, and used for other purposes in the vehicle.

It is also favorable if in a regeneration phase of the exhaust gas cleaning device, while the moment available to the driver is maintained, the electrical machine draws moment. The regeneration phase pertains in particular to the regeneration of a particle filter, especially a Diesel particle filter. The high exhaust gas temperatures needed can be attained much more simply, and a fuel consumption disadvantage in the regeneration can be lessened. Regeneration of the particle filter can also be done while idling. Because the electrical machine has to draw moment that is furnished by the engine, the exhaust gas temperature increases, which is preferable for regeneration of the particle filter. If the exhaust gas temperature is to be increased further, still other provisions, already known at present, for increasing the exhaust gas temperature can additionally be employed.

In contrast to increasing the exhaust gas temperature by lessening the efficiency, the energy of the additionally injected fuel is converted via the electrical machine into electrical energy, which can be stored and used for other purposes. This is especially advantageous, since the on-board electrical systems of vehicles now are typically heavily burdened.

Overall, the method of the invention permits not only improved conversion rates of nitrogen oxides but also an improvement in efficiency during the regeneration phases of the particle filter and storage-type catalytic converter, an expanded operating range in which the particle filter can be regenerated without "adjustment" of the engine, and a regeneration of the particle filter over the entire operating range.

The method is especially preferably used in a Diesel-fueled engine with a starter-generator.

An apparatus according to the invention for performing a method is proposed, in which at least one engine control unit, set up for performing the method, is provided.

BRIEF DESCRIPTION OF THE DRAWINGS

The invention will be better understood and further objects and advantages thereof will become more apparent from the ensuing detailed description of preferred embodiments taken in conjunction with the drawings, in which.

DESCRIPTION OF THE PREFERRED EMBODIMENTS

A drive train, not shown, includes an engine, in particular a Diesel engine, an electrical machine such as an integrated starter-generator, and an exhaust gas cleaning device with a storage-type catalytic converter, in particular an NOx-storing catalytic converter, and with the engine including a particle filter, in particular a Diesel particle filter, and preferably a soot filter.

Figure 1:
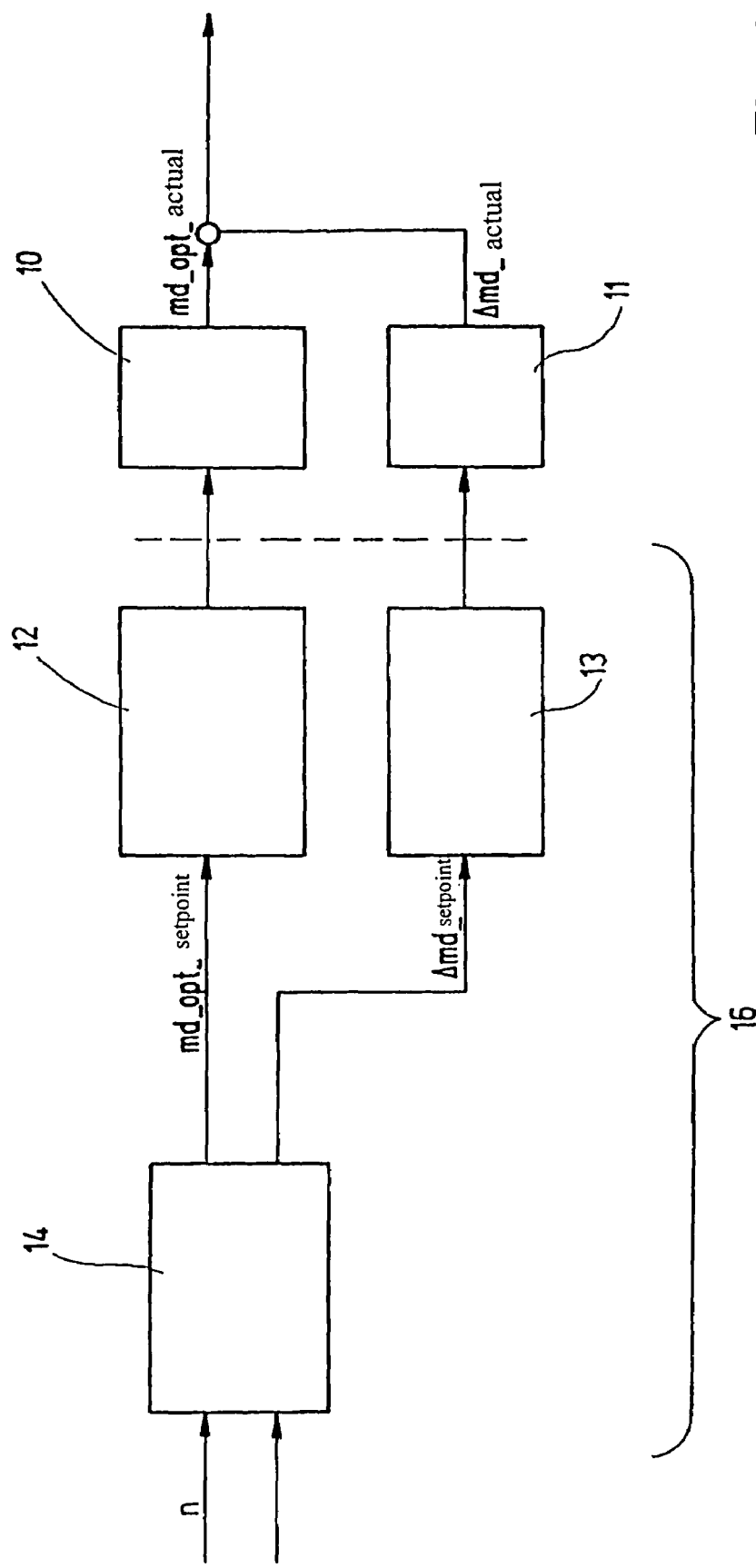
FIG. 1 is a block circuit diagram for ascertaining optimal torques for an engine and an electrical machine in normal operation.

FIG. 1 shows a block circuit diagram for ascertaining optimal torques for an engine 10 and an electrical machine 11 in normal operation of a storage-type catalytic converter, not shown, in which nitrogen oxides or NOx are stored in the storage-type catalytic converter during normal operation. In a preferred, suitably set up engine control unit 16, not further shown, a function block 12 for an EDC moment path and an injection, a function block 13 of a triggering means of the electrical machine 11, and preceding the latter a function block 14 with optimization of a target function $\chi = f(eta, Nox\_crude, \nu)$ are provided.

The engine efficiency $\eta$ can be expressed in lean operation, for a given application of lean operation, as a function of the rpm n, the engine moment md_engine, and optionally further input variables. The crude Nox emissions Nox_crude of the engine 10 can also be expressed for the finished application as a performance graph. The storage rate $\nu$ of the storage-type catalytic converter depends, among other factors, on the exhaust gas temperature and for a given lean application can thus also be expressed in performance curves as a function of n and md_engine. The target function $\chi$ is optimized by the specification of an engine moment md_engine.

While in engine operation without the electrical machine 11, an operating point of the engine 10 is predetermined by a moment demanded by the driver, the electrical machine 11 can draw or output moments (md_SG) within a certain bandwidth. Thus the engine moment md_engine can be selected freely within this bandwidth around the value of md_driver. This makes an engine control strategy possible that optimizes the target function $\chi$, which is dependent on the engine efficiency $\eta$, the crude Nox emissions (Nox_crude), and the Nox storage rate $\nu$, by specifying the engine moment md_driver (function block 14). Still other variables, besides those mentioned, may be used in the target function $\chi$.

The result is an optimal engine moment, md_driver_opt. This optimal engine moment is then incorporated into the conventional moment path of the EDC (function block 12) as a set-point value, md_opt_set point.

In addition, the electrical machine 111 is triggered by the electrical machine triggering in the function block 13 such that the machine draws or outputs the moment $\Delta$md, so that for the drive train, the actual desired moment (md_driver) is left over. With this strategy, in certain phases of operation, an increase in the exhaust gas temperature and hence an improvement in the storage rate $\nu$ of the storage-type catalytic converter can be achieved.

Figure 2:
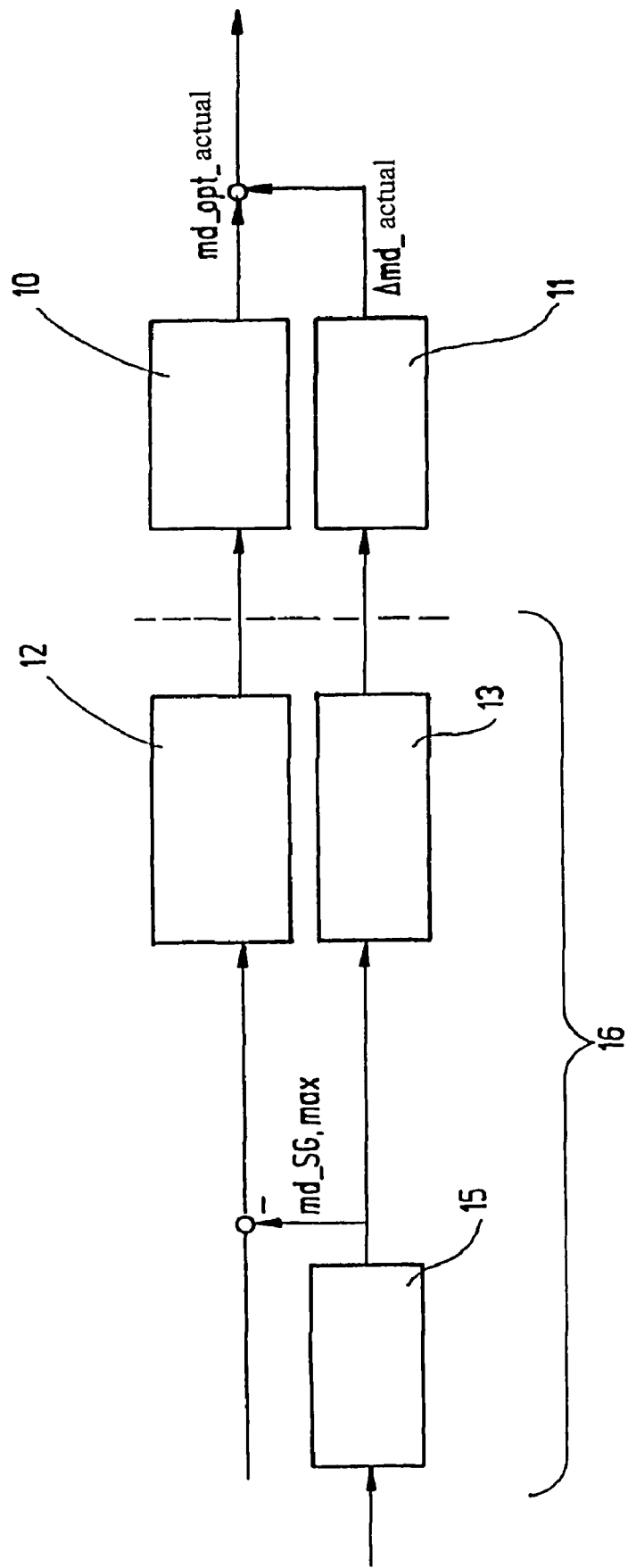
FIG. 2 is a block circuit diagram for ascertaining optimal torques for an engine and an electrical machine in a regeneration phase of a storage-type catalytic converter.

In a regeneration of the storage-type catalytic converter, as shown in block circuit diagram form in FIG. 2, instead of the Nox storage rate $\nu$, the air number $\lambda$ is now considered. The goal is for the lessening of the engine efficiency $\eta$, which is done for the sake of attaining rich operation at $\lambda<1$, to be reduced. A regeneration flag is produced for increasing the load drawn by the electrical machine 11 (function block 15). To that end, the electrical machine 11 should preferably draw its maximum moment (md_SG,max), so that the load for the engine 10 is increased from the moment demanded by the driven to this amount plus the maximum drawn by the electrical machine. As a result, the air number $\lambda$ is lowered, compared to operation without the electrical machine 11. If further provisions already known today, such as choking and/or adjusting the injection of fuel, are employed in order to reduce the air number $\lambda$ to $\lambda<1$, the assumption is then this lower air number λ. The moment available to the driver is unchanged, and the lessening of the engine efficiency η is reduced.

If regeneration for the particle filter is needed, the exhaust gas temperature is often insufficient, unless further provisions are made. In that case, the electrical machine 11 draw torque. As a result, the exhaust gas temperature increases, without changing the moment available to the driver.

If the exhaust gas temperature is then still inadequate, then further provisions already known today for increasing the temperature may be carried out.

The foregoing relates to preferred exemplary embodiments of the invention, it being understood that other variants and embodiments thereof are possible within the spirit and scope of the invention, the latter being defined by the appended claims.

We claim:

1. In a method for operating an engine drive train having a connectable electrical machine, the electrical machine being drivingly connectable to the engine in whose exhaust gas system an exhaust gas cleaning device is located, the method comprising the steps of outputting or drawing a moment by the electrical machine as a function of an operating state of the exhaust gas cleaning device, impressing the electrical machine moment on a moment of the engine that is demanded by an engine control unit, combining the electrical machine moment with the engine moment resulting in a driver moment for the drive train, and then during a regeneration phase of the exhaust gas cleaning device increasing the temperature of the exhaust gas by maintaining the driver moment and drawing moment by the electrical machine, thereby having a positive effect on the engine emissions and efficiency, and deriving an optimized engine moment from a desired moment demanded by a driver, during a storage phase of nitrogen oxides into the exhaust gas cleaning device, drawing or outputting moment by the electrical machine as a function of a bandwidth around the desired moment, and optimizing a target function dependent at least on the engine efficiency, on the crude NOx emissions and on the NOx storage rate, by specification of the engine moment.

2. The method in accordance with claim 1, wherein the optimized engine moment is fed into a moment path of an engine control unit of the engine.

3. The method in accordance with claim 1, wherein in a regeneration phase of the exhaust gas cleaning device, the electrical machine draws an increased moment, and the engine is subjected to a load that is increased by the amount of the increased moment.

4. The method in accordance with claim 2, wherein in a regeneration phase of the exhaust gas cleaning device, the electrical machine draws an increased moment, and the engine is subjected to a load that is increased by the amount of the increased moment.

5. The method in accordance with claim 3, wherein the electrical machine draws its maximum moment.

6. The method in accordance with claim 3, further comprising the step of regenerating a storage-type catalytic converter.

7. The method in accordance with claim 5, further comprising the step of regenerating a storage-type catalytic converter.

8. The method in accordance with claim 3, wherein a Diesel particle filter is regenerated.

9. An apparatus for performing a method in accordance claim 1, wherein at least one engine control unit, set up for performing the method, is provided.

* * * * *

UNITED STATES PATENT AND TRADEMARK OFFICE
CERTIFICATE OF CORRECTION

PATENT NO. : 7,584,607 B2  Page 1 of 1
APPLICATION NO. : 11/338840
DATED : September 8, 2009
INVENTOR(S) : Samuelsen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 0 days.

Signed and Sealed this

Fourteenth Day of September, 2010

David J. Kappos
*Director of the United States Patent and Trademark Office*